Figure 1:
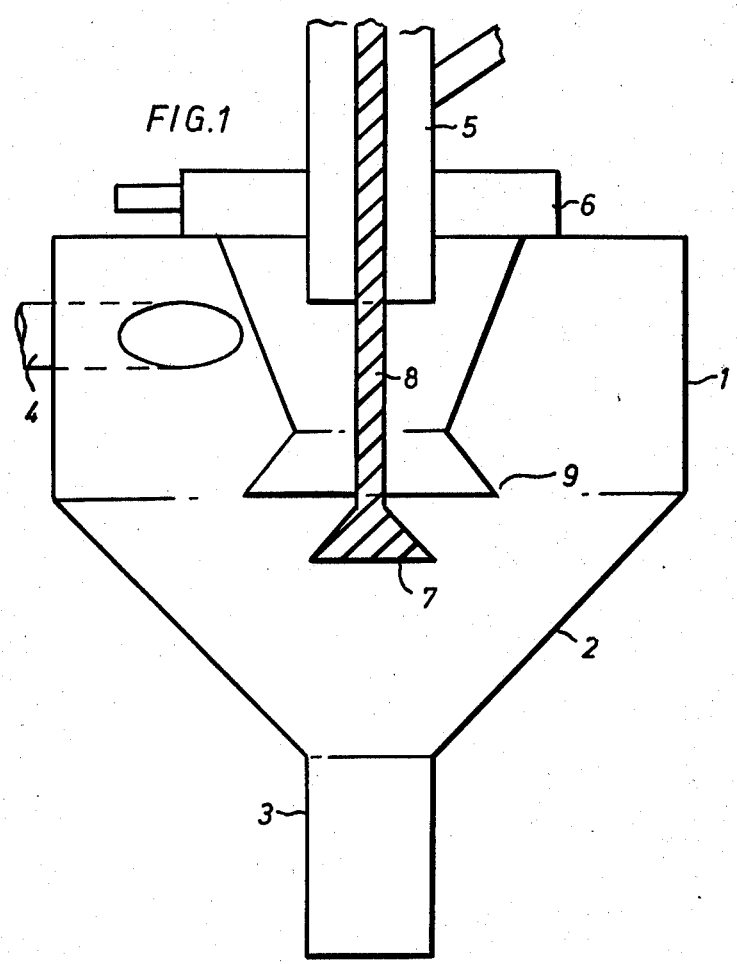

United States Patent [19]
Fothergill et al.

[11] 3,994,480
[45] Nov. 30, 1976

[54] MIXING METHOD

[75] Inventors: Bernard Henry Fothergill, Barton-on-Humber; Henry Earle, Cumberland; William John Kelly, Brigg, all of England

[73] Assignee: Albright & Wilson Limited, Warley, England

[22] Filed: June 6, 1974

[21] Appl. No.: 476,861

Related U.S. Application Data

[62] Division of Ser. No. 300,009, Oct. 24, 1972, Pat. No. 3,856,269.

[30] Foreign Application Priority Data
Oct. 25, 1971 United Kingdom............... 49547/71

[52] U.S. Cl.................................... 259/4 R; 239/15
[51] Int. Cl.²....................... B01F 5/00; B01F 15/02
[58] Field of Search................................... 259/4–8, 259/18–24, DIG. 46, 1 R; 239/15

[56] References Cited
UNITED STATES PATENTS

| | | |
|---|---|---|
| 2,653,801 | 9/1953 | Fontein................................. 259/4 |
| 2,724,580 | 11/1955 | Revallier............................... 259/4 |
| 3,740,612 | 6/1973 | Gauthier.......................... 239/15 X |
| 3,794,299 | 2/1974 | Wagner................................. 259/4 |

FOREIGN PATENTS OR APPLICATIONS

| | | |
|---|---|---|
| 815,247 | 4/1937 | France.................................. 259/4 |

*Primary Examiner*—Leonard D. Christian
*Assistant Examiner*—Alan Cantor
*Attorney, Agent, or Firm*—Flynn & Frishauf

[57] ABSTRACT

A method for mixing liquids and solids to form a mixture, and preferably nitrogen phosphorus potassium fertilizers in which the liquid is introduced tangentially into a mixer to establish a continuous vortex and the solids in the form of a stream are deflected from the central portion of the vortex to form a mixture of the solids with the liquid. The means for deflecting the solids into the vortex may be mechanical or a corona discharge electrode.

5 Claims, 3 Drawing Figures

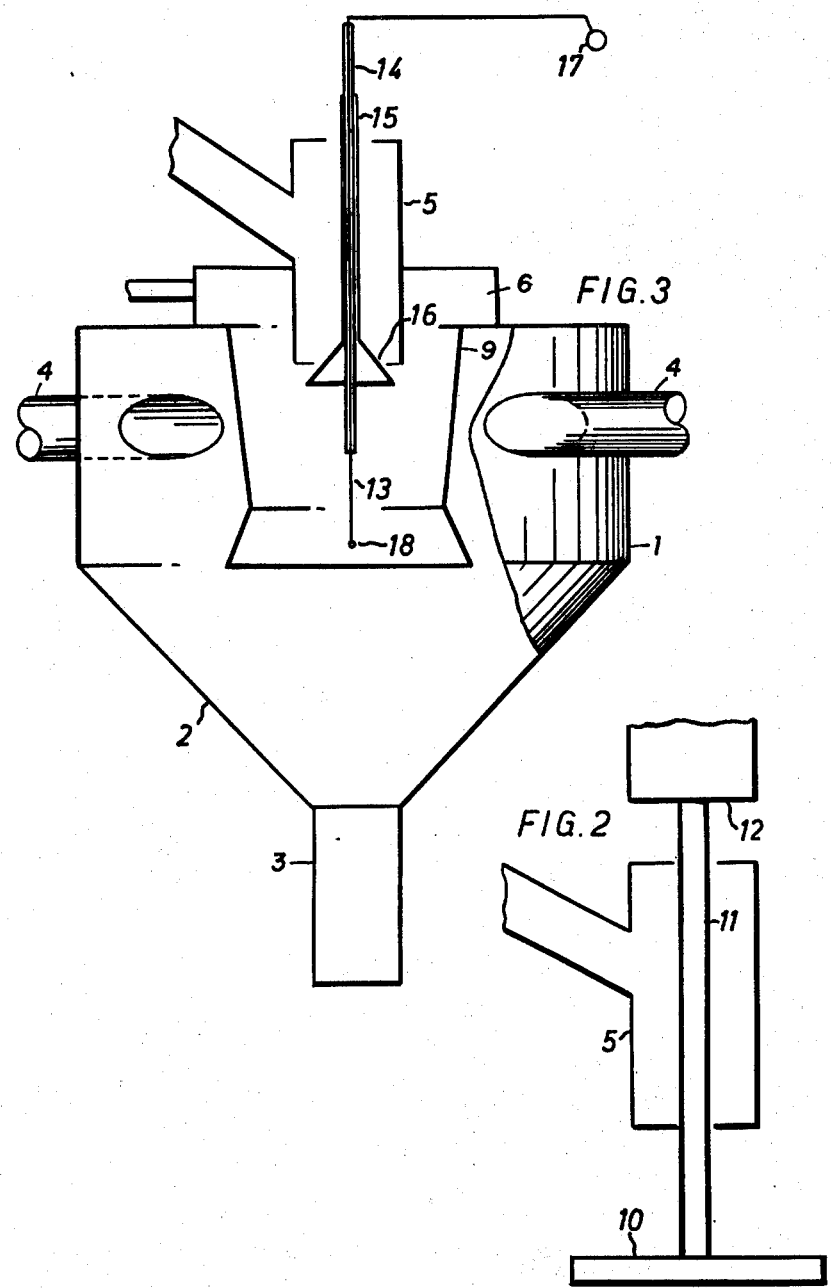

MIXING METHOD

This is a division, of application Ser. No. 300,009, filed Oct. 24, 1972, now U.S. Pat. No. 3,856,269.

The present invention relates to a method for mixing of solids with liquids, for example in the manufacture of N:P:K. fertilisers.

It is known to mix solids with liquids by passing the liquid tangentially into a funnel to form a vortex and dropping solid into the vortex. Thus, it is known from Netherlands Pat. Application No: 69,06224 that in mixing of potassium chloride with an NP melt to form an N:P:K fertiliser having a high proportion of K, the viscosity of the mixture rises rapidly after mixing. In order to prepare a satisfactory prilled fertiliser it is necessary to effect mixing as rapidly as possible so that the mixture may be prilled before the viscosity exceeds a certain critical limit. The Netherlands Specification proposes the use of a cyclone mixer in which the N:P melt is injected tangentially into a vertical cylindrical vessel having a funnel shaped base and a stream of potassium chloride is admitted along the axis of the vessel.

While the mixer described in the Netherlands Specification works satisfactorily for the production of some grades of prilled fertiliser it has not been found satisfactory for those with very high potash contents.

It has long been desired to manufacture prilled fertilisers of high potash content based on potassium chloride, for example those with $N:P_2O_5:K_2O$ weight ratio 15:15:21, 15:15:22, or even higher $K_2O$ values. Attempts to maufacture such products commercially using the mixing apparatus described in the Netherlands Specification have failed due to inadequate mixing, to the formation of blockages, and to the increased time required to traverse the mixer series.

The highest $K_2O$ value achieved commercially, with a $N:P_2O_5$ melt ratio of 1:1, is represented by 15:15:19, using the mixer as described in the Netherlands Specification.

Our invention provides a method for mixing liquids with particulate solids which comprises a funnel shaped base, having a substantially vertical axis, fluid injection means positioned so as to be able to introduce a liquid stream tangentially into the mixer, and thereby establish a vortex of liquid in at least the lower part of the funnel shaped base, solid inlet means positioned so as to be able to pass a stream of the solid substantially along the axis of the funnel, a deflector located substantially at the axis of the funnel below the solid inlet means, preferably at or below the level of the injection means, and adapted to deflect the solid particles radially outwards into the vortex when the apparatus is in use, to form a mixture, and an outlet for the mixture at the base of the funnel.

The method of the invention is carried out in a mixer which may optionally comprise a vertical cylindrical portion located above the funnel. The injection means may comprise one, or preferably more, tangential inlets in the wall of the mixer. The inlets are preferably substantially horizontal, but may alternatively be disposed so as to impart a downward as well as a horizontal, tangential component to the liquid stream. The number and geometry of the inlets are dictated by the need to form a continuous vortex covering substantially the whole of at least the lower part of the internal wall of the funnel. We believe that one of the main causes of blockages in the prior art mixer was the formation of spiral streams in the cylindrical portion of the mixer, and the accumulation of solid on unwetted, and intermittently or insufficiently wetted, portions of the wall, leading ultimately to bridging in the mixer. A continuous vortex will be formed at least in the funnel shaped porton of the mixer provided a sufficient number of streams are admitted with a sufficient tangential velocity.

We have discovered that the optimum condition for mixing are obtained when the liquid forms a continuous, rapidly moving film over the whole conical surface of the mixer, at least up to the highest point at which the deflected solid particles meet the vortex. Preferably the film is at least 1 inch thick where the solid particles meet the vortex. Preferably the vortex should therefore extend downwards to, and most preferably into, the outlet. This is readily achieved if the outlet is sufficiently large, and the rate of rotation of the liquid sufficiently rapid.

The wall of the funnel may typically make an angle of substantially 20° with the vertical, although larger or smaller angles will be operative. The vertical angle may, for example, be as large as 80° or as small as 5°, but is more usually between 10° and 45°. For a given slope of the tunnel wall, the diameter of the outlet will determine the optimum throughput of the mixer. It should preferably be at least sufficiently large to permit the whole of the mixture to flow out through it under the influence of gravity, without building up a substantial head of mixture in the funnel.

The optimum number and size of inlets to obtain a continuous vortex depend on the viscosity and desired throughput of liquid. We prefer to provide two inlets although three, four or even more could be used. The inlets preferably have an aperture sufficiently restricted to form film liquid streams into tangential jets.

Desirably the total cross sectional area of all the inlets is substantially smaller than the cross sectional area of the outlet, typically less than a half and preferably less than a quarter, e.g. an eighth. The minimum cross sectional area of each outlet depends on the viscosity of the liquid and the pressure which it is practicable to build up in the injection means to achieve the desired throughput. The inlets may be located in the wall of the funnel or of an upper cylindrical portion or alternatively may enter through the top of the mixer.

The solids inlet means may conveniently be an open ended vertical pipe located substantially co-axially in the mixer and fed by any suitable means such as a belt or screw. The solids inlet means is positioned so as to allow a stream of solid to fall into the funnel substantially along the axis thereof.

The deflector may desirably be vertically adjustable so that its position can be optimised to suit solid and liquid feed rates. The deflector preferably distributes the solid particles evenly around the funnel. One convenient form of deflector is a cone, apex upward suspended in the stream of falling solid, for example by means of a rod lying substantially along the axis of the mixer. Such a cone is preferably adapted to prevent the solids from falling directly through the outlet at the base of the funnel. This will be achieved when the maximum diameter of the cone is greater than the diameter of the outlet or if the cone is broad enough to intercept all the falling solids and is located at such a distance below the solids inlet that the falling solids have acquired sufficient kinetic energy to be deflected to the wall of the funnel. The cone may be vibrated if necessary, to prevent or inhibit the accumulation of a solid deposit.

Preferably means are provided for preventing the liquid from splashing onto the deflector. For example a protective skirt may be provided above and outside the cone. Typically this may be outwardly splayed so that skirt and cone together define an outward passage through which the solid passes to the wall of the funnel.

An alternative form of deflector useful in the method of the invention which may sometimes be preferred to the static or vibrating cone is a rotatable impeller plate. Typically this is a horizontal plate, usually although not necessarily circular, which may be rotated about a shaft lying in the axis of the mixture by means of a suitable motor. The plate rotates sufficiently fast to throw any particles that are intercepted thereon toward the wall of the funnel by centrifugal force. The plate may rotate in the same, or preferably in the opposite sense to the vortex. The rotating thrower has the advantage of helping to provide an even radial distribution of the deflected particles.

According to a specially preferred embodiment of our invention, we have discovered that electrostatic charging of the solid, by means of a highly charged corona discharge wire insulated from the earthed metallic body of the mixer, provides a paticularly effective form of deflection.

The principle of electrostatic deflection has, of course, been applied hitherto to separators for removing ontrained solids from gas streams and to the dispersion and application of paints and powder coatings. We believe, however, that this is the first proposal for using this technique for the purpose of mixing a solid with fluid. According to this embodiment of our invention, a linear conductor, such as a wire, insulated from the rest of the apparatus and lying substantially along the axis of a skirt which is typically cylindrical, below the solids inlet, is charged to a sufficiently high potential to produce a corona discharge towards the earthed skirt. The stream of falling solid is preferably formed into a freefalling annular curtain surrounding the linear conductor, for example by means of cone located above the conductor and below or within a concentric feed pipe. The particles are charged electrostatically and many are repelled outwards to the vortex of melt flowing within the earthed funnel wall. The charged particles repel each other so ensuring a thorough dispersal, this increases the rate of wetting of the particulate solid and inhibits any tendency of the solids to agglomerate. A particular beneficial effect observed is that the finer particles tend to be deflected further from their downwards path than the coarser paticles; this also increases the rate of wetting of transient floating islands of the particulate solid.

Our invention provides a method for mixing particulate solids and liquids which comprises forming a liquid into a continuous vortex dropping a stream of solid substantially along the axis of the vortex and deflecting the solid outwardly into the vortex, preferably from a point at or below the level at which the continuous vortex is established.

Preferably the liquid is formed into a continous rapidly rotating film over substantially the whole of at least the lower part of a funnel shaped surface, the vortex extending downward to or preferably into an outlet channel at the base of the funnel.

Preferably the liquid is an NP melt and the solid is potassium chloride. The NP melt may be prepared in the normal manner described, for example, in the aforesaid Netherlands Specification. Typically a mixture of ammonium nitrate and wet process phosphoric acid is treated at boiling point with ammonia gas to a pH of 2.7 to 3.0 (measured in 10% aqueous solution). The solution is then evaporated to 0.3 to 1.0% water content and the melt passed at suitably elevated temperature and pH to the mixer. The potassium chloride is preferably preheated, and the apparatus including the liquid and solid inlets and the funnel may be steam jacketed to keep the mixture sufficiently fluid.

According to a particularly preferred embodiment our invention provides a method for the mixing of particulate solids and liquids which comprises forming the liquid into a substantially continuous vortex, establishing a corona discharge in the neighborhood of the vortex, passing a stream of the solid through the corona discharge, thereby charging the solid electrostatically and forming the stream into a dispersed cloud of electrostatically charged particles and passing the cloud of particles into the vertex.

The method of our inventiion will now be described with reference to the preferred apparatus in which it is carried out, illustrated in the drawings of which FIG. 1 is a sectional elevation of one form of mixer according to the invention and FIGS. 2 and 3 are diagramatic cross sections of alternative forms of deflector.

The apparatus of FIG. 1 comprises a cylindrical mixer chamber 1 having a 12 inch high funnel shaped base 2 tapering at an angle of 20° to the verticle, from a 13inch upper diameter down to a vertical 4 inch diameter outlet pipe 3. The mixer is provided with a pair of diametrically opposed tangential inlets 4, each of 3/4 inch diameter, also illustrated in FIG. 3. A vertical axial inlet pipe 5 provides access to the interior of the chamber 1 through the top of the mixer. The top of the mixer is provided with a wash water inlet 6. A conical deflector 7 is suspended co-axially within the funnel shaped portion 2 of the mixer and below the level of the inlets 4 by a rod 8 situated co-axially within the co-axial inlet pipe 5. The rod 8 is slideable, to permit the deflector 7 to be raised or lowered. A skirt 9 situated above the conical deflector 7, surrounds the co-axial inlet pipe 5. The lower part of the skirt 9 is outwardly splayed so that the skirt 9 and deflector 7 together define an outwardly and downwardly disposed annular passage.

An alternative to the conical deflector 7 is illustrated in FIG. 2 and comprises a circular, horizontal impeller plate 10 mounted at the lower end of a vertical rotatable shaft 11 which lies co-axially within the co-axial inlet pipe 5 and which may be rotated by the action of a motor 12.

A further alternative illustrated in the FIG. 3 comprises a fine electrically conducting wire 13 disposed along the axis of the co-axial skirt 9. The upper part of the wire 13 is enclosed in an insulating covering or rod 14, made of some material such as PTFE or silicone rubber which will withstand the operating temperature, and which in turn lies co-axiallywithin a tubular support 15, by means of which a conical flow controller 16 is located below or within the co-axial inlet pipe 5 and above the lower, uninsulated, part of the wire 13. The wire 13 is connected at the upper end to a source of high electrical potential 17, and it may optionally be terminated at its lower end by a small sphere of insulating material 18.

When the mixer of FIG. 1 is in operation a liquid, such as an NP melt is passed into the mixer chamber 1 through the tangential inlets, 4 at a rate sufficient to form a continuous vortex in the funnel 2. A stream of solid is dropped into the mixer chamber 1 through the co-axial inlet pipe 5 and, striking the deflector 7, is deflected outwardly into the vortex in the funnel 2. The swirling mixture of liquid and solid passes out of the mixer through the outlet pipe 3.

In the alternative of FIG. 2 the falling stream of solid is intercepted by the impeller plate 10 which is rotated sufficiently rapidly by the action of the motor 12 to throw the solid particles outwards into the vortex by centrifugal force.

In the alternative of FIG. 3 the falling stream of solid particles is directed into an annular curtain around the wire 13 by the cone 16. The mixer, including the skirt 9, is earthed and the wire 13 is charged to a high electrical potential to establish a corona discharge. The falling particles acquire an electrostatic charge and are repelled outwardly, as a dispersed cloud, into the vortex in the funnel 2.

The invention is illustrated by the following examples: A 93 to 95% solution of ammonium nitrate was mixed with cold phosphoric acid containing 49 to 53% $P_2O_5$ in such proportions that the final product had a $N:P_2O_5$ weight ratio of 1:1. The mixture was treated with gaseous ammonia in a neutraliser at boiling point and atmospheric pressure to the equivalent of pH 2.7 to 3.0 in a 10% aqueous solution. Some concentrated sulphuric acid was added to raise the temperature and prevent crystallisation of monoammonium phosphate. The NP solution containing 4 to 8% water was evaporated at 0.1 to 0.15 atmospheres absolute pressure to form a melt containing 0.3 to 1.0% water. The pH was then raised with ammonia. The hot melt (170° to 180° C) was passed to the mixer illustrated in FIG. 1 through the tangential inlets 4 at a rate of 8 cubic metres per hour. Ground preheated potassium chloride, was passed into the mixer through the co-axial inlet 5 at a rate of 7.4 metric tons per hour. The mixed NPK melt was passed directly through the outlet pipe 3 to a spinning, perforated prill bucket at the top of a prilling tower. Hot prills were recovered by raking from the floor of the tower, screened and cooled.

The process operated satisfactorily for the manufacture of a consistent, high quality prilled product having an $N:P_2O_5$ $K_2O$ ratio of 15:15:21.

We claim

1. A method of mixing particular solids and liquids which comprises forming the liquid into a substantially continuous vortex, establishing a corona discharge in the neighbourhood of the vortex, passing a stream of solid particles through the corona discharge, thereby charging the particles electrostatically and forming the stream into a dispersed cloud of particles, and passing the cloud of particles into the vortex.

2. A method for mixing together a nitrogen phosphorus fertilizer melt with solid potassium chloride to form a nitrogen phosphorus potassium fertilizer in a mixer comprising introducing a stream of said liquid nitrogen phosphorus melt tangentially into the mixer to establish a continuous vortex with the smallest diameter part thereof being at the bottom in at least the lower part of the mixer;

introducing a stream of particulate solid potassium chloride into the mixer substantially in the central region of the vortex and substantially in the axial direction of the vortex;

deflecting the particulate solid potassium chloride substantially radially outward into the vortex at a level below the level which said stream of liquid is introduced into said mixer to form said nitrogen phosphorus potassium fertilizer; and withdrawing said nitrogen phosphorus potassium fertilizer mixture from the mixer.

3. A method according to claim 2 wherein the mixer has a funnel-shape lower interior surface having an angle to the vertical of from 10° to 45° and wherein the vortex is formed be establishing a rotating film of the liquid on said lower interior surface.

4. A method according to claim 2 comprising establishing a corona discharge in the neighborhood of the vortex, passing the stream of particulate solid potassium chloride through the corona discharge, thereby charging the particles electrostatically and forming the stream into a dispersed cloud of particles and passing the cloud of particles into the vortex to form said mixed sodium phosphorus potassium fertilizer.

5. A method according to claim 2 comprising subsequently forming the mixed nitrogen phosphorus potassium fertilizer into prills.

* * * * *